Feb. 18, 1969  S. E. CLOUD  3,428,015
SPHERICAL VEHICLE
Filed Dec. 29, 1966  Sheet 1 of 2
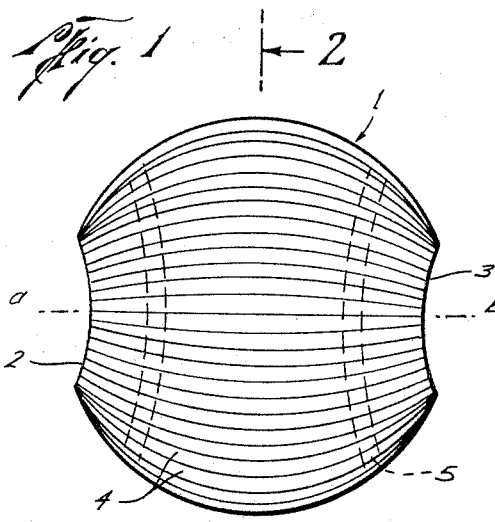
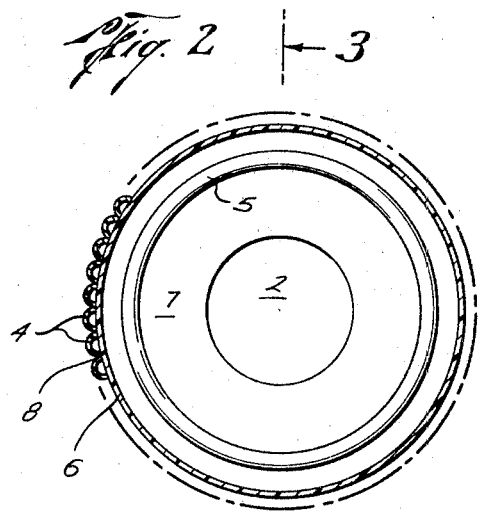
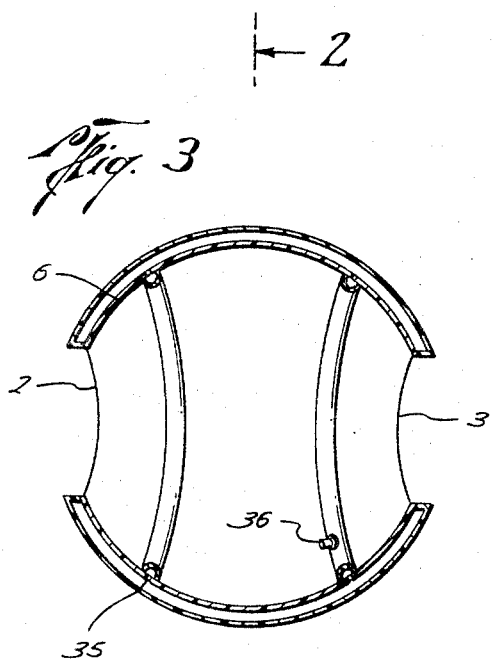
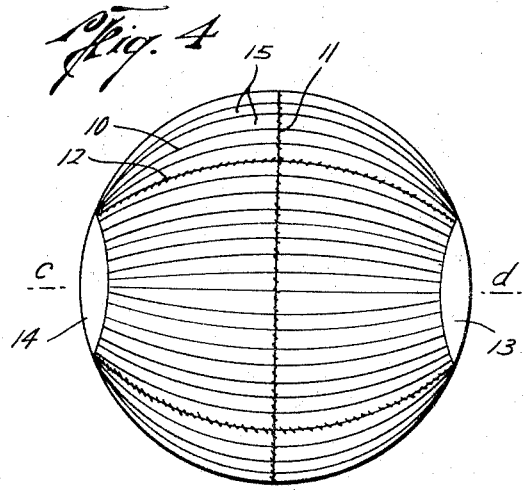
Samuel E. Cloud
INVENTOR
BY Arnold and Roylance
ATTORNEYS Feb. 18, 1969    S. E. CLOUD    3,428,015
SPHERICAL VEHICLE
Filed Dec. 29, 1966    Sheet 2 of 2

Samuel E. Cloud
INVENTOR

BY Arnold and Roylance
ATTORNEYS

United States Patent Office 3,428,015
Patented Feb. 18, 1969

3,428,015
SPHERICAL VEHICLE
Samuel E. Cloud, 5934 Southcrest, Houston, Tex. 77033
Filed Dec. 29, 1966, Ser. No. 605,732
U.S. Cl. 115—1
Int. Cl. B60f *3/00;* B63h *1/38*
6 Claims

ABSTRACT OF THE DISCLOSURE

A generally hollow spherical device of a size convenient for receipt of person or other large object is provided. Included are tubes forming great circles around the device, and at least one tube nonparallel to the tubes which form great circles.

---

This invention relates to a spherical device capable of a multitude of uses. More particularly, this invention relates to a generally thick-walled hollow spherical device—the wall having therein tubes which circumscribe great circles. The device is capable of receiving a man or other object such as an automotive vehicle, and can be moved by actions of the man or vehicle therein either with or without the aid of an auxiliary power source.

The prior art has provided many devices and types of devices of generally spherical shape which are in some respects satisfactory for the uses to which applicant's invention is directed. None of the prior art devices is satisfactory in all respects, however, and there is no prior art device which is satisfactory from the structural standpoint to accomplish the objectives, and obtain the advantages, of the present invention.

The need for an operable and practical spherical device capable of receiving and being motivated by a man or vehicle therein is quite apparent. For example, such devices would render a valuable service to the military, which has always searched for an economical means of transportation over both land and water, especially one which is capable of traversing remote and generally inaccessible areas, one which is capable of construction for operation solely on the power source of another entity, and one which is capable of sufficient reduction in size so that it may be readily stored for transportation by other means to another point of use. The military also has a crying demand for a vehicle of this type which is sufficiently economical so that it may be disposed of after use without necessitating its continued handling in, for example, a combat zone.

Sportsmen and other citizens also have a significant need for a device of this type which they may enter either with or without a vehicle, and transport, for example, across streams where no bridge is available, or difficult terrain over land.

Further, a significant demand exists in the amusement field for a device of this type which may be entered by a person and propelled with or without the aid of a motor or the like.

In general, these and other needs for a device of this type have been heretofore unsatisfied because of the lack of a device of this character which is operable and practical to accomplish the purposes for which it is intended.

This invention, however, does provide a novel structure by which these goals may be realized and by which the operability and practicality of a spherical vehicle for use on land or water are assured.

In order that these and other objects and advantages of the invention may be clearly understood, the invention will be described in terms of specific embodiments which are illustrated in the accompanying drawings, which form a part of this specification and wherein:

FIGURE 1 is a pictorial view of one embodiment of spherical device of this invention;

FIIURE 2 is a sectional view taken along the line 2—2 of FIGURE 1;

FIGURE 3 is a sectional view taken along the line 3—3 of FIGURE 2;

FIGURE 4 is a pictorial view of a device in accordance with another embodiment of this invention;

Figure 5:
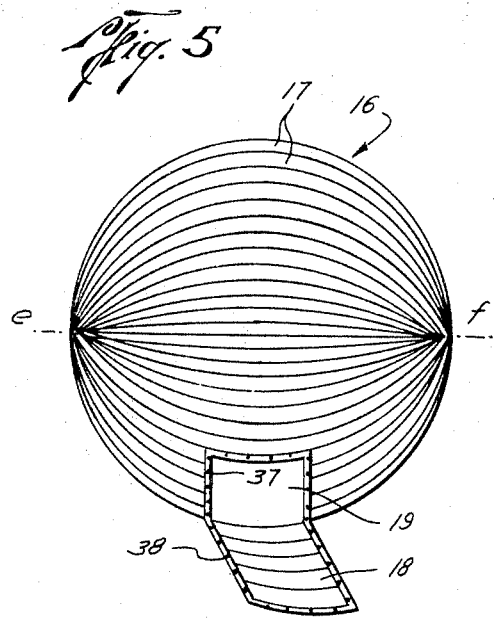
FIGURE 5 is a pictorial view of a device according to another embodiment of the invention.

Referring now more particularly to the drawings, there is illustrated in FIGURE 1 a spherical device 1 constructed in accordance with one embodiment of this invention. The relatively thick wall 6 of the device 1 is formed of a suitable flexible material such as natural or synthetic rubber or a suitable synthetic polymeric material. Generally, a waterproof material is preferred. The wall 6 forms the hollow body of the sphere. The body of the sphere defines within the wall 6 an interior chamber 7 of a size and shape convenient for receipt of a person or other relatively large object, such as for example an automotive vehicle. Of course, the sphere may be constructed of any suitable size and might, for example, be large enough to accommodate a plurality of persons.

At the ends of a polar axis $a$–$b$ extending through the sphere 1 are openings or portholes 2 and 3, which provide a means for entry of person, object or vehicle into the sphere. The portholes also provide means for entry of air into the interior chamber whereby persons therein may freely breathe.

Encircling the sphere 1 and circumscribing great circles thereabout are a plurality of tubes 4, which in this embodiment are formed on the exterior surface of the wall 6. These tubes may be formed of the same material as is used to make the wall 6. The walls of tubes 4 may be secured to the wall 6 at the points 8 by any suitable means, such as by heat sealing, or the wall 6 and tubes 4 may be formed as an integral unit.

Each of the tubes 4 follows a great circle formed on the surface of the sphere by the intersectoin of the sphere with a plane passing through the center of the sphere and parallel to the polar axis $a$–$b$. Any number of such tubes may be included, and the tubes may each have means for the entry of a gas therein in order that the tubes may be selectively inflated and deflated.

Upon inflation of the tubes 4 with air or other suitable gas, the spherical device 1 may be readily moved from place to place by a person or vehicle located in hte interior chamber 7 thereof, and for example may be transported across a body of water because of the buoyancy provided by the tubes 4. Of course, the material of construction of the wall 6 and tubes 4 must be such that the wall and tubes are not crushed by the weight of the person or vehicle, and must be sufficiently flexible to flatten out under a vehicle if the device is to be used in that manner.

Also illustrated in FIGURE 1 are cross tubes 5. These tubes are also attached to the wall 6, and may be integral therewith. If the tubes 4 are affixed to the exterior of the sphere 1, then the tubes 5 are desirably affixed to the interior of the sphere, as illustrated in this embodiment.

The tubes 5 are nonparallel to the tubes 4, and again any suitable number of such tubes may be included, such as the two illustrated in the FIGURES 1–3 embodiment. These tubes may follow small circles, which are circles defined on the surface of the sphere formed by the intersection with a plane (for example, a plane perpendicular to the plane of any one of the great circles discussed above in connection with the tubes 4) which does not pass through the center of the sphere, a great circle of a plane nonparallel to polar axis $a$–$b$, or these tubes may be curved in a manner similar to the stitching on a baseball, as illustrated in the FIGURES 1–3 embodiment.

These tubes 5 afford additional support to the structure, and means may be included to readily inflate and deflate these tubes also.

The tubes 5, if constructed as in the FIGURES 1–3 embodiment, also provide a convenient means for inflating each of the tubes 4. That is, one of the tubes 5 may be constructed with a spigot 36 for the introduction of a gas into the tube 5, and holes 35 through the wall 6 provide fluid communication between the tube 5 and each of the tubes 4. In this manner, inflation of the tube 5 results in inflation also of each of the tubes 4.

In the embodiment of the invention illustrated in FIGURE 4, a spherical device 9 which is formed with a plurality of sections 10 is shown. The sphere 9 is constructed very much like the sphere 1 of the FIGURES 1–3 embodiment, with portholes 13 and 14, and with tubes 15 formed on great circles circumscribing the sphere. The sphere 9 is, however, formed of a plurality of sections 10, each of which is of the shape of a hemispherical polygon. That is, the sections are formed between two great circles the planes of which are parallel to the polar axis $c$–$d$ of the sphere 9, the great circles defining the border 12 of the section 10, and a great circle, the plane of which is perpendicular to the polar axis $c$–$d$, defining the border 11 of the section 10.

The sections 10 thus formed may be secured together in any suitable manner to form the sphere 9, as for example by stitching. Suitable holes may be formed in the body walls along the borders 11 and 12 so that stitching the sections together might be done, for example, in the field. In this manner, the sections may be readily disassembled after use, for facility in transportation and shipment of the device.

Of course, the sections 10 may be permanently sewn or otherwise secured together if desired. Other suitable shapes of the sections 10 may be employed.

It is noted that the sphere of the FIGURE 4 embodiment is constructed without cross tubes, but some manner of such tubes—such as short cross tubes each extending through only one section—may be employed if desired. In this embodiment, it may be convenient to provide each of the tubes 15 with a spigot for the introduction of a gas therein.

The sphere 16 of the FIGURE 5 embodiment is constructed of a plurality of tubes 17 following great circles the planes of which are parallel to the polar axis $e$–$f$ of sphere 16. In this embodiment, there are no portholes in the sphere at the opposite ends of the polar axis. Instead, means of entry of person or vehicle into the device is provided by a door 18 which forms an opening 19 of a size convenient for entry into the interior chamber of the sphere. The door 18 may be completely detachable or, as in the FIGURE 5 embodiment, only partially so. Suitable means are included for attaching and detaching the door 18. For example, a string may be pulled through the holes or eyelets 37 on the sphere body and corresponding holes 38 on the door. The string can then be removed when it is desired to open the door 18.

The FIGURES 1–5 embodiments are generally used without the aid of an auxiliary power source.

Figure 6:
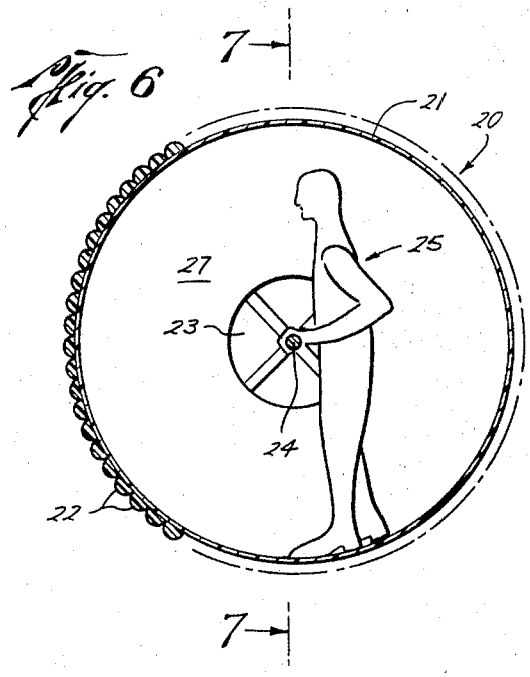
FIGURE 6 is a pictorial view, partially in section, of a device according to still another embodiment of this invention.
Figure 7:
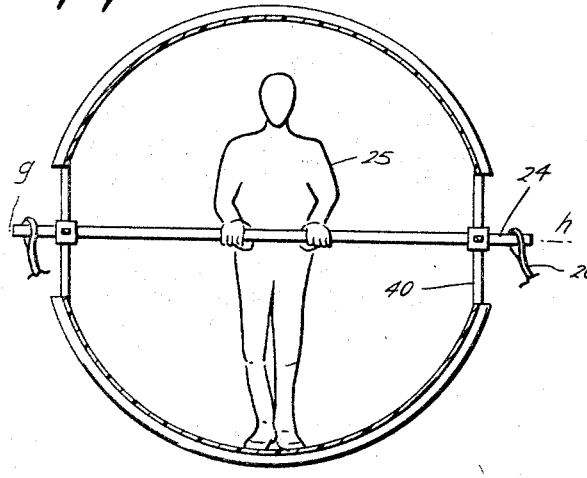
FIGURE 7 is a cross-sectional view, taken along the line 7—7 of FIGURE 6.

FIGURES 6 and 7 illustrate still another embodiment of the invention which is preferably used in conjunction with an auxiliary power source. In this embodiment, the sphere 20 is constructed of a plurality of tubes circumscribing great circles about the sphere, the great circles formed by planes parallel to the polar axis $g$–$h$ passing through the center of sphere 20. A porthole 23 is located in the sphere about one end of the polar axis.

A man 25 is seen to be standing in the interior chamber 27 of the sphere, with his feet on the interior surface of the wall 21, and holding a rod 24 which extends through the device along the polar axis $g$–$h$ of sphere 20. The rod 24 extends through each end of the sphere, and may be connected to lines 27 (see FIGURE 7) which in turn may be operably connected to a motor or the like of any suitable type (not shown) for pulling or turning the sphere. For example, the lead lines 27 may be connected to a motor vehicle, and the sphere pulled along by the vehicle (not shown). Suitable means for retaining the rod 24 are included, such as the cross-bars 40. And of course, any suitable means for entry into the interior chamber 27 may be provided.

This form of the invention is especially useful as an amusement device. It is understood that in any of the illustrated embodiments auxiliary equipment inside the spherical device might be provided. For example, a seat might be suspended between opposing sides of the wall of the sphere, and the sphere itself might be connected by a superstructure to a number of other such spheres, or suspended in the air or water from a superstructure. In this manner, an amusement device may be provided which is useful on either land or water, or in the air, or any combination thereof.

Figure 8:
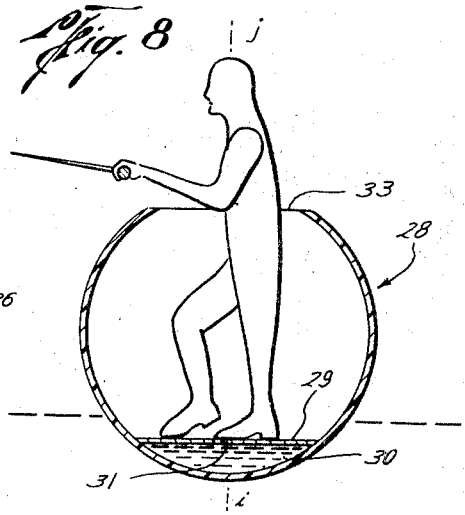
FIGURE 8 is a pictorial view, partially cut-away, of a device according to still another embodiment of this invention.

The FIGURE 8 embodiment illustrates a sphere 28 which has a sector 30 adapted to be filled with water or other suitable fluid in order to retain the sphere in an upright position. In other respects, the sphere may be constructed similar to any of the foregoing embodiments, but it conveniently has only one porthole 33 at one end of the polar axis $i$–$j$. The sector 30 is formed opposite the porthole 33 by a plane passing through the sphere on a small circle. The sector thus formed has one wall 29 on which a person may stand with the sphere in an upright position. Means for entry of water or other fluid into the sector 30, in order to retain the sphere upright, are included. Such means may conveniently take the form of the opening 31 which may be securely closed when desired.

When the sphere 28 is placed in a body of water 34, it will readily float in an upright position. Thus it may be conveniently used for example, for fishing or hunting purposes. The sportsman may use the device as in the other embodiments until he reaches his preferred destination. He then may fill the sector 30 through opening 31. When ready to travel to another spot, he may drain the fluid from the sector 30, whereupon he can again transport himself to another destination.

The FIGURE 8 embodiment may be formed with a porthole opposite the porthole 33 for free entry of water into the sector 30.

As is seen from the foregoing embodiments of the invention, a generally hollow spherical device is provided which is suitable for locomotion by a person or vehicle located therein. Means of entry of a person or vehicle is provided, and in all embodiments a person or vehicle located in the interior chamber of the sphere may provide self-locomotion without the aid of auxiliary power means. Further, the device may be constructed so that auxiliary power means are conveniently employed.

In this manner, a device is provided which is extremely useful as a means of self-locomotion in difficult environments, across bodies of water, etc. Special application of the invention may be realized by the military services.

It is further seen that a spherical device capable of many uses, such as an amusement device, is provided. The device provided by this invention is, importantly, of such structural configuration as to be operable and practical for the above uses and advantages. And the construction is such that the device may be readily deflated to a very small size although the inflated device may be quite large.

While the invention has been described in terms of particularly useful embodiments, it will be understood to those skilled in the art that various alternative structures may be employed which do not depart from the scope of the invention, which is defined only by the following claims.

What is claimed is:

1. A generally hollow device suitable for locomotion by a person or other object positioned therein, without the aid of auxiliary power means, comprising:
   a thick-walled flexible body of generally spherical shape, defining an interior chamber of a size convenient for receipt therein of a person or other relatively large object;
   a first plurality of tubes encircling said body, circumscribing great circles thereabout, said tubes including means for inflation thereof;
   at least one tube encircling said body which is non-parallel to any of said first plurality of tubes; and,
   means for affording entry of a person or other object into said interior chamber.

2. A device in accordance with claim 1, wherein said device is deflatable to a small size convenient for facility of transportation and shipment.

3. A device in accordance with claim 1, wherein said body is formed of a plurality of sections secured together to form said sphere.

4. A device in accordance with claim 1, wherein there is included a section in said sphere which may be filled with a liquid to retain said sphere in an upright position.

5. A device in accordance with claim 1, wherein a rod is positioned in said sphere along an axis of the sphere.

6. A device in accordance with claim 1, wherein portholes are included at axially opposite ends of the sphere.

References Cited

UNITED STATES PATENTS

| | | | |
|---|---|---|---|
| 1,265,496 | 5/1918 | Pare. | |
| 1,865,095 | 6/1932 | Frei | 272—1 |
| 2,508,304 | 5/1950 | Sturtevant | 9—2 |
| 2,735,471 | 2/1956 | McLean | 152—187 |
| 2,838,022 | 6/1958 | Wilson. | |
| 2,873,459 | 2/1959 | Marz | 9—2 |
| 2,938,727 | 5/1960 | Nosak. | |
| 3,066,951 | 12/1962 | Gray | 280—206 |
| 3,252,711 | 5/1966 | Young | 280—78 |
| 3,329,425 | 7/1967 | Gieseler | 272—1 |

KENNETH H. BETTS, *Primary Examiner.*

U.S. Cl. X.R.

280—78, 206; 272—1, 69; 9—1; 115—20